United States Patent

Yamazaki

[11] Patent Number: 5,182,681
[45] Date of Patent: Jan. 26, 1993

[54] ROTATING HEAD MAGNETIC RECORDING AND REPRODUCING DEVICE HAVING AUTOMATIC TRACKING CONTROL FUNCTION

[75] Inventor: Shohei Yamazaki, Hamamatsu, Japan

[73] Assignee: Yamaha Corporation, Hamamatsu, Japan

[21] Appl. No.: 519,242

[22] Filed: Apr. 24, 1990

Related U.S. Application Data

[63] Continuation of Ser. No. 138,659, Dec. 24, 1987, abandoned.

[30] Foreign Application Priority Data

Dec. 27, 1986 [JP] Japan .................................. 61-309496
Sep. 2, 1987 [JP] Japan .................................. 62-219765

[51] Int. Cl.$^5$ .......................................... G11B 15/467
[52] U.S. Cl. .................................. 360/70; 360/73.04; 360/73.09; 360/73.12; 360/77.15
[58] Field of Search .................. 360/27, 32, 70, 73.04, 360/7.09, 73.11, 73.12, 77.14, 77.15

[56] References Cited

U.S. PATENT DOCUMENTS

4,739,420  4/1988  Odaka et al. .................... 360/77.14

OTHER PUBLICATIONS

Terry Shimada, "DAT (Digital Audio Tape Recorder)", Digest of Technical Papers, Jun. 4, 1986, p. 41.

*Primary Examiner*—Joseph L. Dixon
*Assistant Examiner*—David L. Robertson
*Attorney, Agent, or Firm*—Spensley Horn Jubas & Lubitz

[57] ABSTRACT

A magnetic recording and reproducing device with an automatic tracking control function which can record and reproduce signals by means of a rotary head incorporating plural heads. The device performs tracking control by detecting, based on a timing of a synchronizing signal of a track, crosstalks of pilot signals obtained from adjacent tracks and comparing the crosstalks to use the difference as a tracking error signal. In a first example of the invention, the device comprises means which, when time points at which the tracking error signals is obtained are located at uneven time interval, transmits the tracking error signal to the tracking control system with a transfer gain which varies substantially in inverse proportion to the time interval. According to the invention, when the time interval for obtaining the tracking error signal is long, the transfer gain becomes low whereas when the time interval is short, the transfer gain becomes high. Therefore, even if the tracking error detection interval varies, its effect on the tracking servo is substantially equalized whereby the amount of data untraced by the heads can be minimized. In a second example of the invention, the device includes circuitry for separately sampling and holding alternate tracking error signals. The alternate tracking error signals are held until the next corresponding tracking error signal occurs, typically corresponding to a half rotation of the rotary head. Therefore, although the alternating tracking error signals occur at uneven time intervals, the time which these signals are held is the same with the result that the influence of the tracking error signals is equal and tracking is optimized.

8 Claims, 12 Drawing Sheets

ROTATING HEAD MAGNETIC RECORDING AND REPRODUCING DEVICE HAVING AUTOMATIC TRACKING CONTROL FUNCTION

This is a continuation of copending application Ser. No. 138,659 filed on Dec. 24, 1987, now abandoned.

BACKGROUND OF THE INVENTION

This invention relates to a magnetic recording and reproducing device and, more particularly, to a tracking control with improved accuracy during reproduction in a magnetic recording and reproducing device such as an R-DAT (rotary head type digital audio tape recorder) in which a tracking error signal can be obtained only at uneven intervals.

The R-DAT is a device which converts analog signals such as an audio signal into PCM signals, records the PCM signals on a magnetic tape and reproduces the same.

As shown in FIG. 2, the device comprises a rotary head 2 having two magnetic heads A and B separated by 180 degree interval on the circumferential surface of a cylinder 1. A tape 3 is loaded from a cassette housing 4 with a vertical post 5 or with an inclined post 6, wound on the circumferential surface of the rotary head 2 for 90 degrees, supported by a fixed guide 7, and run by a capstan 8 and a pinch roller 9.

The diameter of the rotary head 2 is 30 mm, and the winding angle for the tape is 90 degrees. For recording and reproduction, at the mode I which is usually used, the rate of the rotary head 2 is 2,000 rpm (circumferential speed: 3.14 m/sec) and the speed of the tape 3 is 8.15 mm/sec in the direction identical to that of the rotary head 2. The relative speed of the head 2 as against the tape 3 is 3.13 m/sec.

The recording system with R-DAT is a helical scanning azimuth recording. Its tape format as shown in FIG. 3 defines a track angle of 6° 22′ 59.5″ and azimuth angle of ±20° with the tracks alternately traced by two heads A and B.

FIG. 4 shows a track format wherein audio data are recorded at the center of a PCM region, and sub-codes and control signals such as ATF (automatic track finding) are recorded on both sides thereof.

The PCM region comprises 128 blocks as shown in FIG. 5 each of which has recording regions for a block synchronizing (indicating the starting position of the block), ID (identification) code, block address, parity check code, and audio data. At the mode I, audio data uses 2's complement codes of quantization bit of 16 bits of the sampling frequency of 48 kHz, and the PCM data is divided into 8 bits in higher order and 8 bits of lower order, modulated from 8 bits into 10 bits (8-10 modulation) and recorded in 10 bits.

For tracking control during reproducing in the R-DAT, an automatic tracking system with ATF is employed. ATF system detects and compares crosstalks from two adjacent tracks by ATF signals recorded on the tracks, and controls the speed of the capstan motor for running the tape so as to make the crosstalks identical.

The principle of ATF will now be described below.

ATF signals are recorded at two locations on one track, i.e., ATF1 and AFT2, as shown in FIG. 4. As shown in the format in FIG. 6, pilot signal f1 and synchronizing signal f2 (or f3) are recorded on each track. The frequencies are specified respectively:

f1 = 130.67 kHz
f2 = 522.67 kHz
f3 = 784.00 kHz

These frequencies are low enough not to have much azimuth loss. The head A traces the track of the synchronizing signals of f2. The head B traces the tracks of the synchronizing signals of f3. The track length of a synchronizing signal differs between an odd number frame and an even number frame, which are defined as one (1) block and 0.5 block respectively.

If it is assumed that the head A is tracing the track T4, pilot signals f1 of adjacent tracks T3 and T5 are obtained from the head A due to crosstalks in addition to a reproduced signal from the track T4. This is because the head has a width 1.5 times as large as a track. If the head A is tracing the track T4 correctly, crosstalks from the tracks T3 and T5 become equal, but if the head is deviated to either direction, the crosstalks from them become different from each other. The crosstalks from the adjacent tracks T5 and T3 are detected by detecting amplitude levels of the pilot signal f1 on the track T5 and of the pilot signal f1 of the track T3 at the detection timing of the synchronizing signal f2 of the track T4. The difference in the crosstalks therefore is presumed to represent tracking errors.

FIG. 7 shows a prior art ATF device based on the above mentioned principle. A reproduced signal from the head A is applied to a low-pass filter 16 via a reproduction amplifier 14 to extract pilot signal f1. The extracted pilot signal f1 is applied to a tracking error detection circuit 21, detected in envelope by an envelope detection circuit 18, and applied to a sample hold circuit 26. A synchronizing signal detector 19 detects synchronizing signal f2 with an equalizer 20 and a comparator 22, and the comparator 22 outputs "1" during the period when the synchronizing signal is being detected.

A logic circuit 24 outputs sample hold signals SP1 and SP2 at the timing of the detected synchronizing signal f2. As the sample hold signal SP1 is provided at a timing immediately after the start of detection of the synchronizing signal f2, if the output from the circuit 18 is sampled with the SP1, a sample hold circuit 26 can hold crosstalk amplitude level of the pilot signal f1 on the track T5 which is the track next to the track T4 currently being traced. A subtractor 28 implements subtraction between the output of the sample hold circuit 26 and the output of the detector 18. A sample hold signal SP2 is produced after the time equivalent to 2 blocks after the start of detection of the synchronizing signals f2 (timing substantially at the center of the pilot signal f1 on the track T3). By sample holding the output from the subtractor 28 with this signal SP2, the difference in crosstalk amplitude levels between the pilot signals f1 of the track T3 and of the track T5 positioned on both sides of the track T4 which is currently being traced is sample held at the circuit 30.

The output from the circuit 30 is applied to a capstan servo circuit 34 as a tracking error signal. The circuit 34 controls the speed of the capstan motor 36 in such a manner that the tracking error becomes zero. This eventually controls the running speed of the tape 10 thereby correcting the tracking error.

In the ATF device shown in FIG. 7, when the head A is deviated to the left from the center, crosstalks of the pilot signal from the track T3 increases. A negative signal is therefore held at the sample hold circuit 30. In order to correct this, the capstan motor 36 increases the speed.

When the head A is deviated to the right, the crosstalk of the pilot signal from the track T5 increases, and a positive signal is held at the circuit 30. For correcting this, the speed of the capstan motor 36 is decreased.

The ATF system can thus control tracking as stated in the foregoing.

In the track format of R-DAT, tracking errors are detected at only two locations, i.e., ATF1 and ATF2 for one track. A tracking error detected, at one detection timing is retained for tracking control until the next time of the tracking error detection. However, the interval of tracking error detection is not uniform as shown in FIG. 8; e.g., in terms of angle, interval from ATF1 to ATF 2 is 64.746° whereas that from ATF2 to ATF1 of the next track is 115.254°. The difference in the interval is about 1 : 2. Therefore, the error signal detected at ATF2 is used for tracking control for a duration of time twice as long as the error signal detected at ATF1. The error signal detected at ATF2 exercises a stronger influence than the one detected at ATF1 with a resulting imbalance in the tracking control.

The head preferably traces a track in parallel thereto as shown in FIG. 9 with a solid line A, but due to errors in the manufacture of the head (uneven circumferential surface of a cylinder or eccentricity of the rotational axis) or warps of the tape due to uneven tension, the head often zig-zags as shown in the figure with a dotted line B or deviates from the center by angle error as shown in a dot-and-chain line C in practice.

In order to correct such defects, there has been proposed a dynamic tracking method which directs a magnetic head with a piezo electric element incorporated in the head so as to force the head to correctly follow the track (for video tape recorder). However, the method has the disadvantage that the structure of the head becomes extremely complicated.

It is therefore necessary to devise a method which allows a head to trace a track optimally without the necessity of addition of such a complicated system even if deviation or zigzagging of the head is unavoidable. The optimal state herein means that the head is placed upon a track at the center of the track width at the center in the longitudinal direction of a track having the audio data PCM region. So far as the head remains in the area, as the width of the head is 1.5 times as large as the width of the track, it can sufficiently read the PCM region to minimize missing data.

If, however, the detection interval is not uniform as mentioned above, such an optimal state cannot be sustained. More specifically, the tracking error signals in the state shown in FIG. 10 become substantially the same in absolute value in ATF1 and ATF2 but with opposite polarities as shown in FIG. 11. Since, however, the tracking servo uses timewise average values of tracking error signals, if the detection interval is not uniform, the average value does not become zero. Tracking error signal in ATF2 therefore exercises a stronger influence. The tracing therefore is controlled in such a manner that the error in ATF2 is corrected to a greater extent, which makes the head to deviate from the center of the track as shown in FIG. 12. Under these state, as the areas where head is deviated from the PCM region becomes enlarged and more PCM data will be missing, making correct reproduction thereof extremely difficult.

It is, therefore, an object of the invention to solve this problem encountered in the prior art and provide a magnetic recording and reproducing device which can conduct tracking in an optimal manner by equalizing effect of tracking error signals when the detection thereof is performed with an uneven interval.

SUMMARY OF THE INVENTION

For achieving the above object, it is one aspect of the present invention to transmit tracking error signals obtained at uneven time intervals to the tracking control system with transfer gain which is substantially in inverse proportion to the time interval.

Namely, there is provided a magnetic recording and reproducing device comprising a rotary head incorporating a plurality of heads for recording and reproducing an input signal by tracing a magnetic recording medium, these heads also reproducing signals recorded on left and right adjacent tracks simultaneously, and data recorded on the magnetic recording medium including the input signal, a synchronizing signal used for timing control of recording and reproducing of the input signal and a pilot signal of a predetermined frequency used for tracking control, and tracking control means comprising tracking error signal generation means for generating, based on the timing of the synchronizing signal, a tracking error signal by detecting crosstalk components of the pilot signals on left and right adjacent tracks and comparing these components with each other and relative speed control means for controlling, responsive to the tracking error signal, a relative speed of the magnetic recording medium with respect to the heads of the rotary head by controlling transfer gain of the tracking error signal in the relative speed control means in accordance with a time interval between time points at which the tracking error signal is generated.

According to this aspect, when the time interval between which error signals are obtained is long, the transfer gain becomes low whereas when it is short, the transfer gain becomes high. Therefore, even if the tracking error detection time interval varies, its effect on the tracking servo is substantially equalized. Even if the head traces a track in a zigzag manner in a form of letter S as shown in FIG. 9 or inclined from the axis, the tracking can be stabilized at an optimal state as shown in FIG. 10, thereby minimizing the amount of untraced data.

In another aspect of the invention, there is provided a magnetic recording and reproducing device comprising a rotary head incorporating a plurality of heads for recording and reproducing an input signal by tracing a magnetic recording medium, these heads also reproducing signals recorded on left and right adjacent tracks simultaneously, and data recorded on the magnetic recording medium including the input signal, a synchronizing signal used for timing control of recording and reproducing of the input signal and a pilot signal of a predetermined frequency used for tracking control, a series of which pilot signals are reproduced alternately by the heads of the rotary head, and tracking control means comprising tracking error signal generation means for generating, based on the timing of the synchronizing signal, a tracking error signal by detecting crosstalk components of the pilot signals on left and right adjacent tracks and comparing these components with each other, holding and renewing means for holding the tracking error signals generated alternately in response to the alternately generated pilot signals until next timing of generation of a corresponding tracking error signal and renewing the tracking error signal thus held at the next timing of generation of the corresponding tracking error signal and relative speed control means for controlling, responsive to the tracking error signals held by the holding and renewing means, a relative speed of the magnetic recording medium with respect to the heads of the rotary head.

According to this aspect of the invention, even if plural tracking error signals are not obtained at equal intervals, the time interval between corresponding tracking error signals is constant so that the time period during which the tracking error signal is held becomes constant. Influence to the tracking servo therefore becomes substantially equal and, even in a case where the head traces a track in a zigzag manner in a form of letter S or inclined from the axis, it can be stabilized at an optimal state as shown in FIG. 10, thereby minimizing the amount of untraced data.

BRIEF DESCRIPTION OF THE DRAWINGS

In the accompanying drawings.

DESCRIPTION OF PREFERRED EMBODIMENTS

Figure 1A:
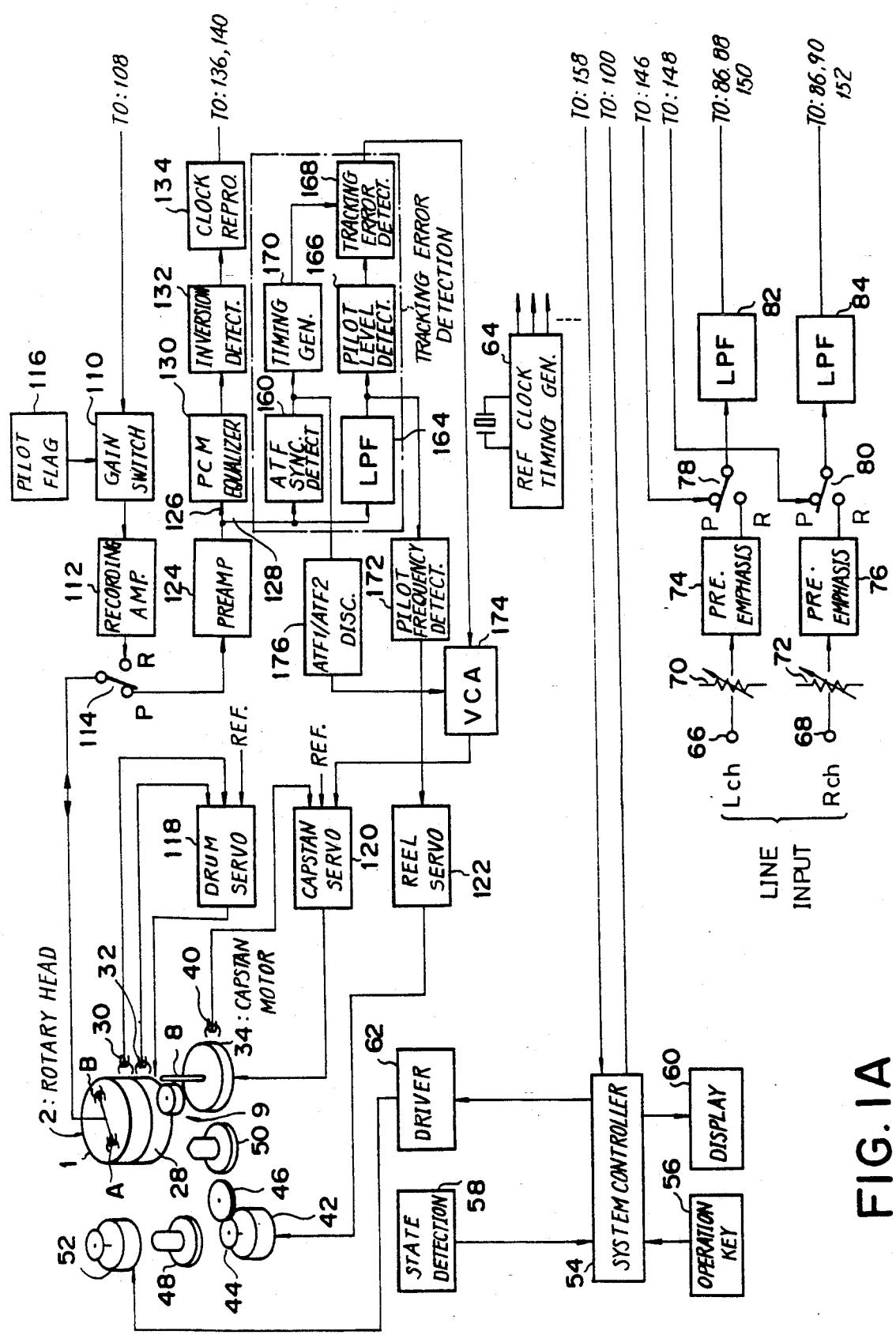
FIGS. 1A and 1B are block diagrams showing an embodiment in which this invention is applied to an R-DAT.
Figure 1B:
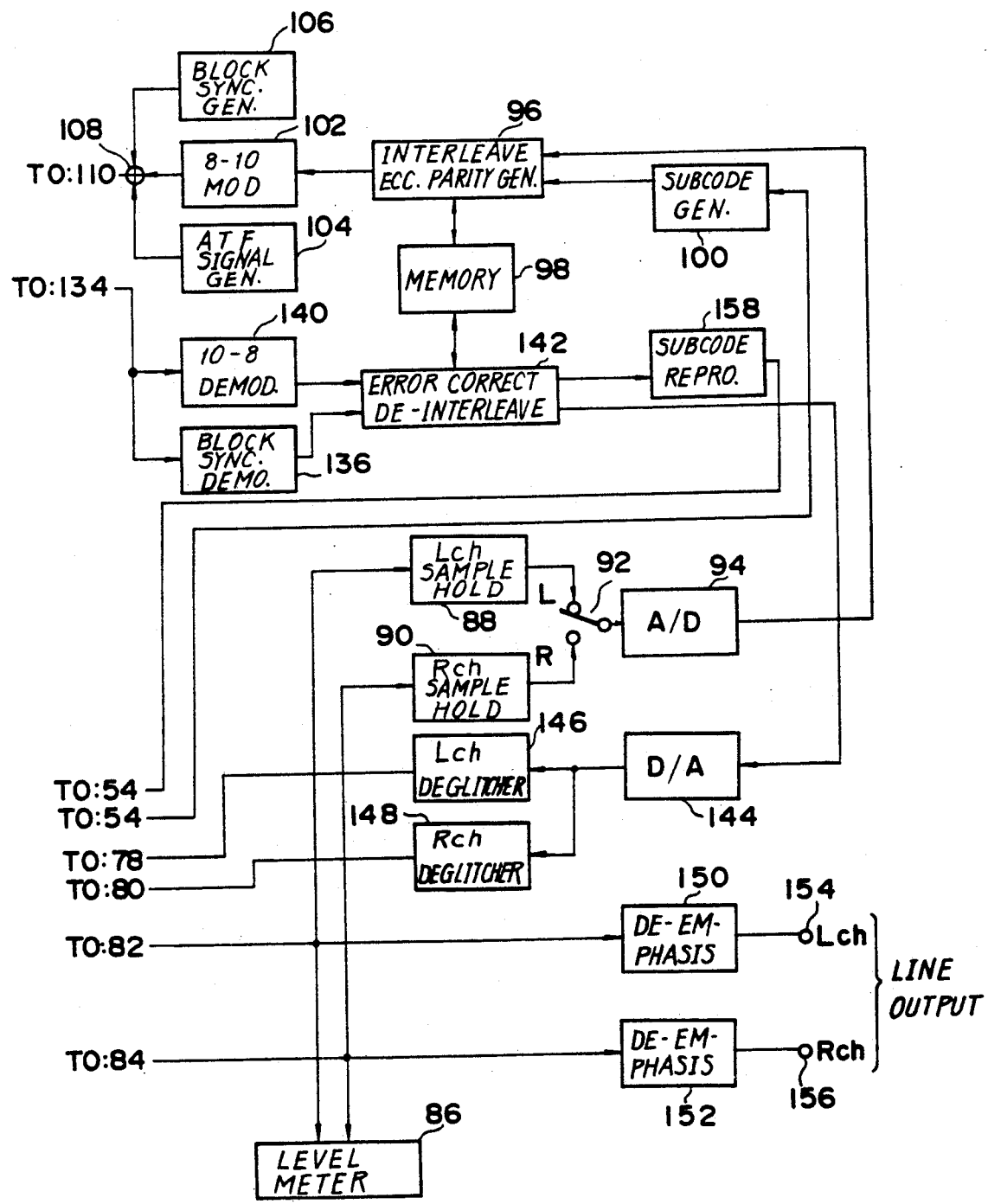
Figure 2:
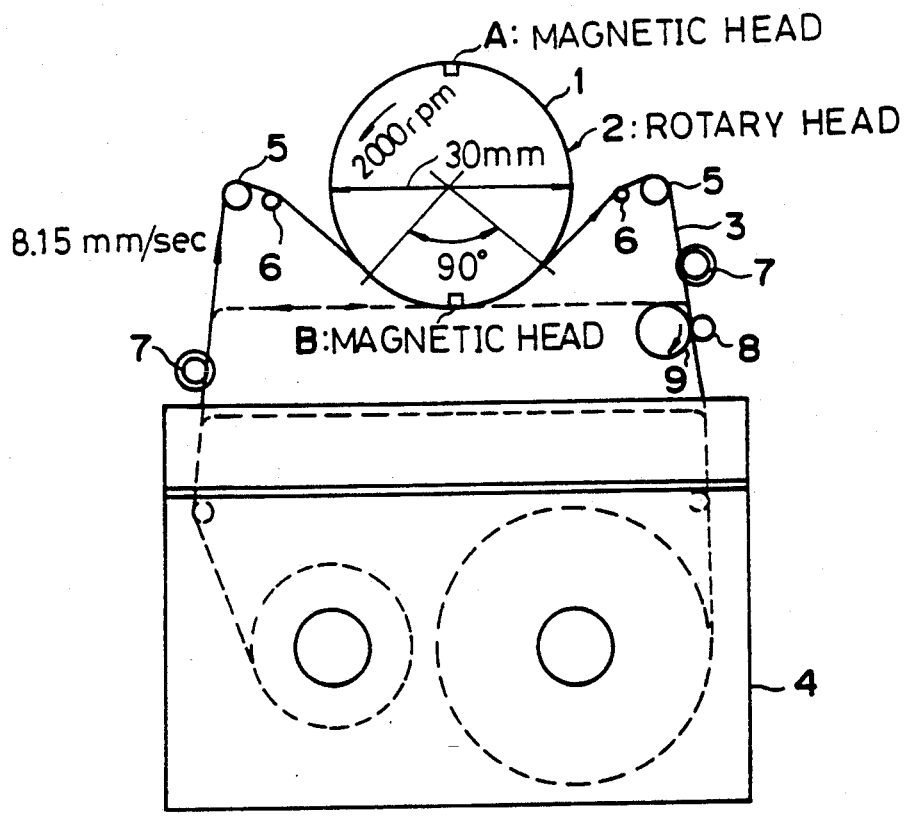
FIG. 2 is a view showing the mechanism of the R-DAT.

FIGS. 1A and 1B show an embodiment in which this invention is applied to an R-DAT.

A system controller 54 comprises a microcomputer and controls operations at each section in accordance with contents of commands issued by a keyboard 56 or detection section 58 inside the system, displaying necessary items such as music number and time on a display 60.

A reference clock/timing generation circuit 64 generates various reference clocks and timing signals to be used in the signal processing system or servo processing system by quartz oscillation outputs.

A rotary head 2 has two magnetic heads A and B arranged on the circumferential surface of a cylinder 1 at an interval of 180 degrees. The head 2 is driven by a drum motor 28. The head 2 is further provided with an FG (frequency generator) 30 for speed detection and a PG (phase generator) 32 for reference rotational position detection.

A capstan motor 34 comprises a motor shaft comprising a capstan 8, and a pinch roller 9 abuts on the capstan 8 to control and run the tape. An FG 40 is provided on the capstan motor 34 for speed detection.

A reel motor 42 drives reel tables 48 and 50 via pulleys 44 and 46 to wind the tape. A loading motor 52 loads cassettes and tapes, and is actuated by a command from the system controller 54 by a driver 62.

Description will now be made as to the operation of the sections used for recording.

Analog audio signals of right and left channels are applied from input terminals 66 and 68. These signals are adjusted in recording level by attenuaters 70 and 72, pre-emphasized by pre-emphasis circuits 74 and 76 and supplied to switches 78 and 80.

The switches 78 and 80 are connected to the "R" side at the time of recording and supplies input analog signals to low-pass filters 82 and 84. The low-pass filters 82 and 84 are provided in order to attenuate unnecessary high frequency components in input signals and prevent aliasing due to sampling. They have a cut-off frequency which is about one half of the sampling frequency. The low-pass filters 82 and 84 function as demodulating filters in the reproduction mode. A level meter 86 displays recording level and reproducing level.

The output analog signals from the low-pass filters 82 and 84 are applied to sample hold circuits 88 and 90 to be sampled therein with a predetermined sampling frequency (48 kHz at R-DAT mode I).

The data from both channels are provided on a time shared basis by switching a switch 92 alternately, and converted into digital data (data of 16 bits for one channel) which forms the PCM data by an analog-to-digital converter 94.

The PCM data is divided into the upper order 8 bits and lower order 8 bits, and applied to an interleave/ECC parity generation circuit 96 for interleaving (rearrangement of data), parity generation (addition of error correction codes), addition of ID codes (identification codes), etc. via a memory 98. Sub-codes are prepared by a sub-code generation circuit 100 based on the data on the music number or time which are provided by the system controller 54.

The PCM data is applied to an 8-10 conversion circuit 102 which converts 8-bit data into 10-bit data respectively in a certain manner (i.e., in such a manner that the band is narrowed by restricting the interval of reversing magnetization and make DC current component zero).

Figure 4:
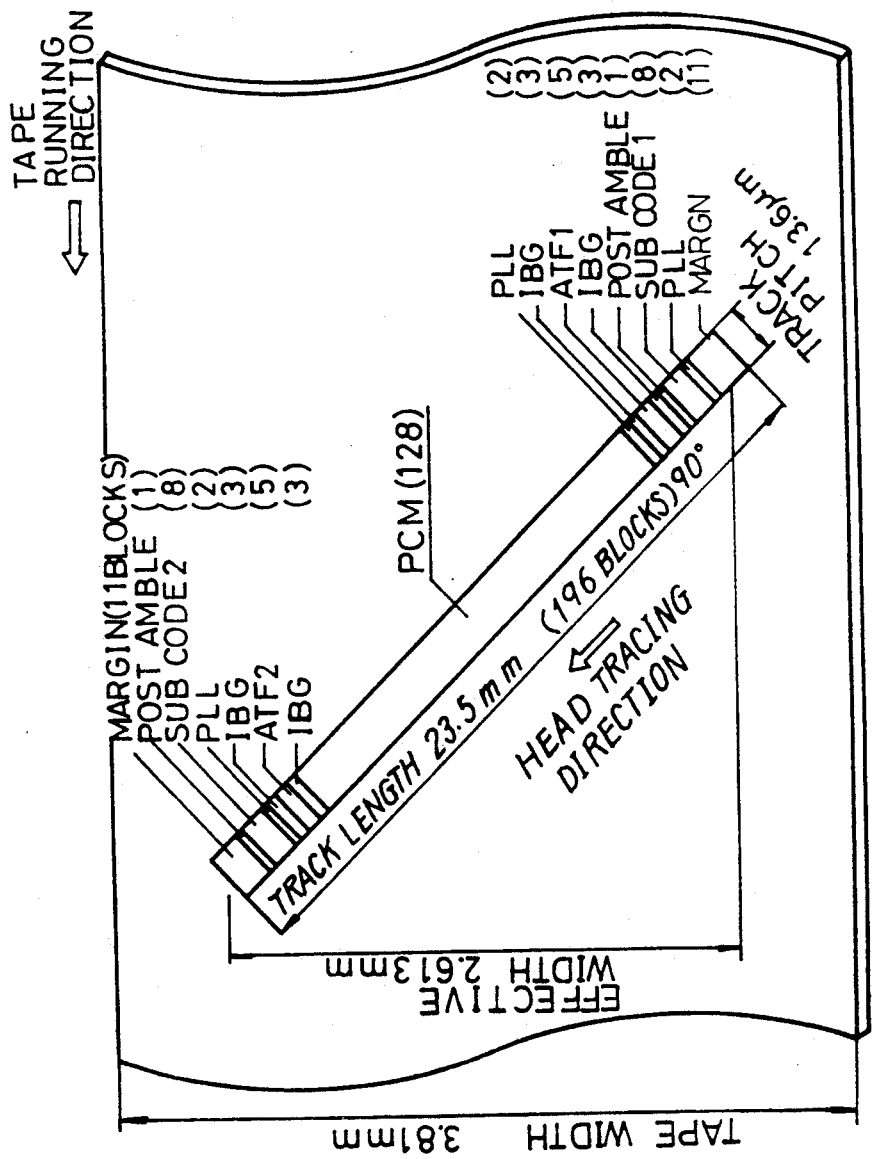
FIG. 4 is a track format of the R-DAT.
Figure 5:
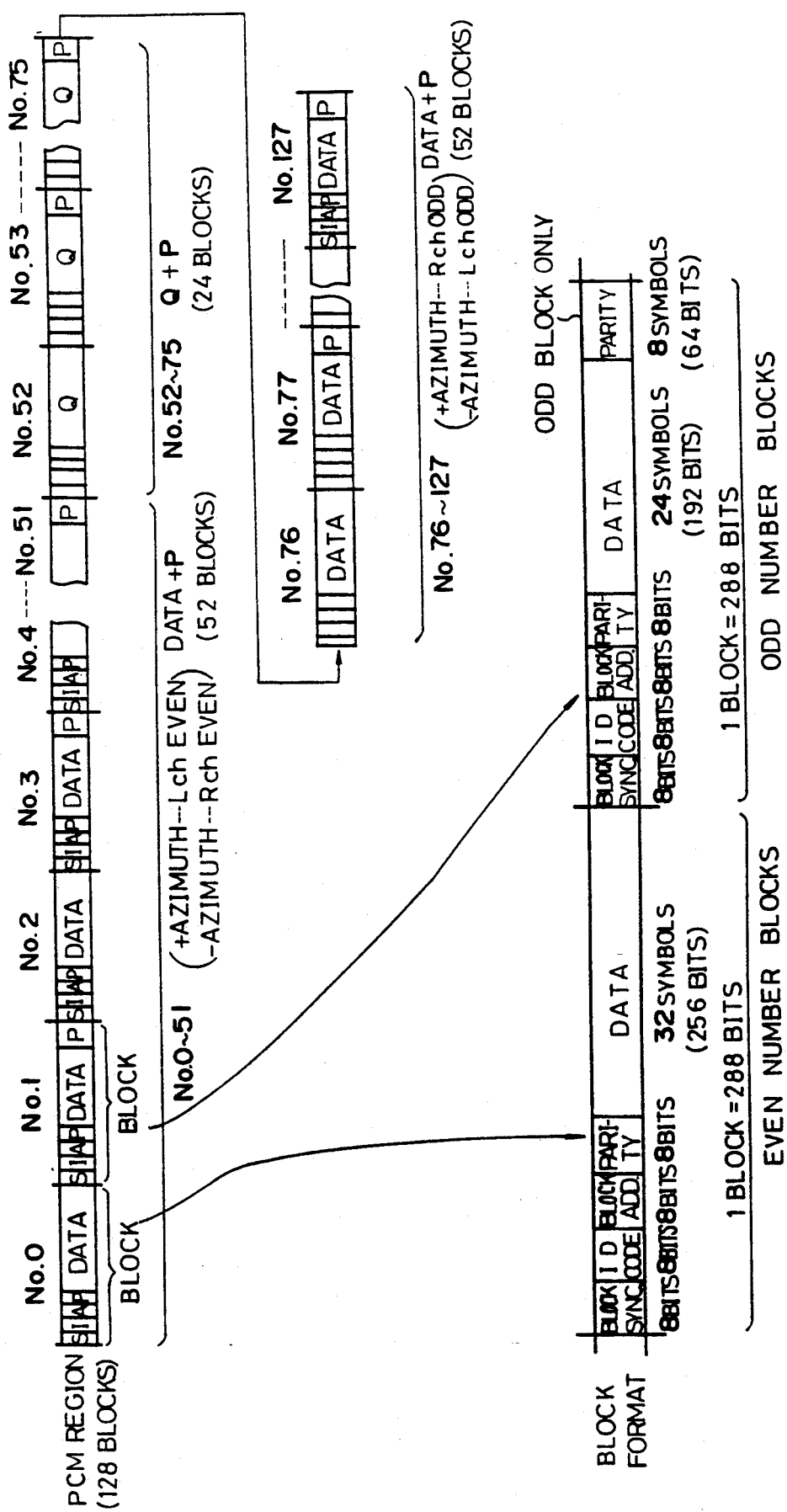
FIG. 5 is a format of PCM region shown in FIG. 4.
Figure 6:
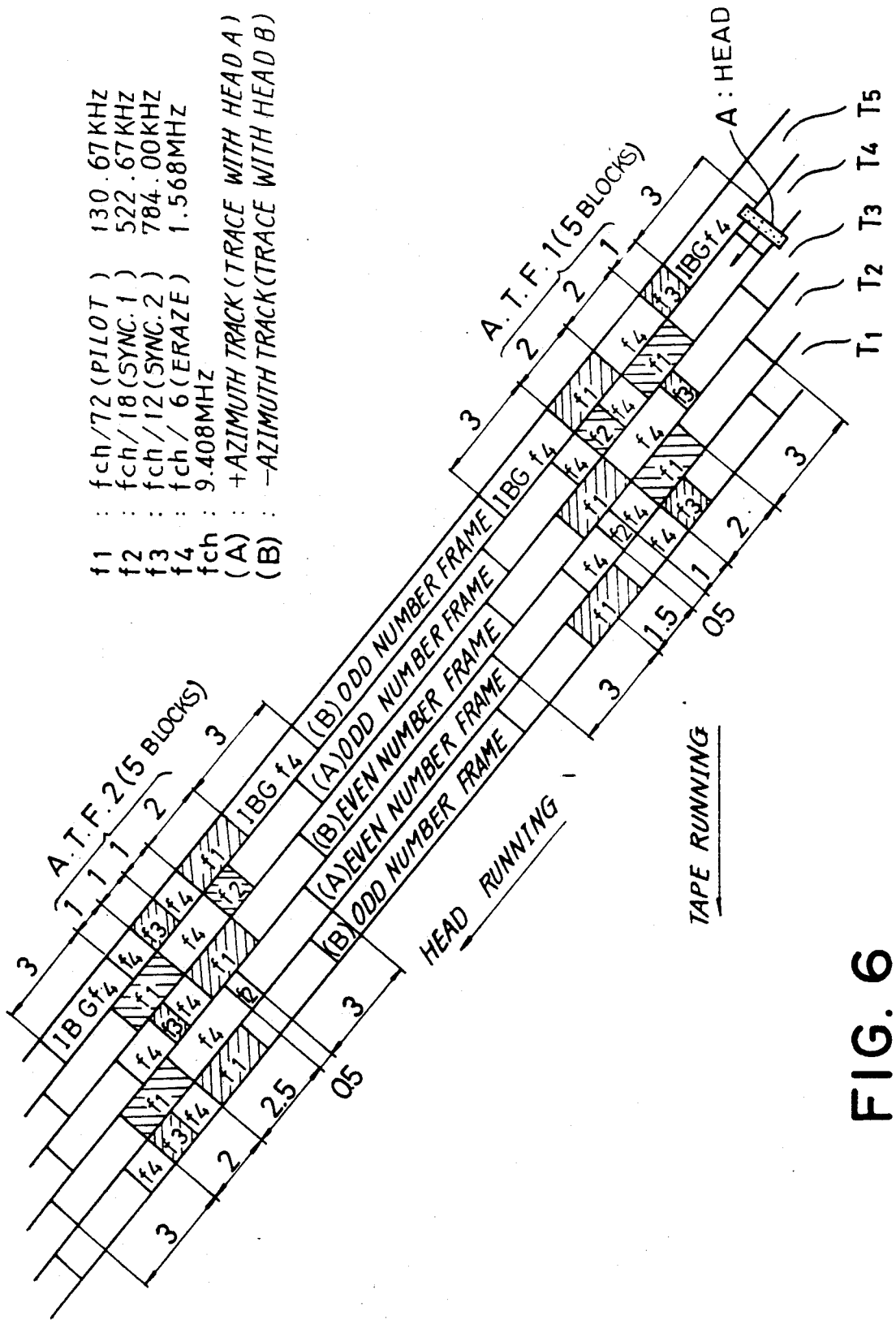
FIG. 6 is a format of ATF1 and ATF2 of FIG. 4.
Figure 7:
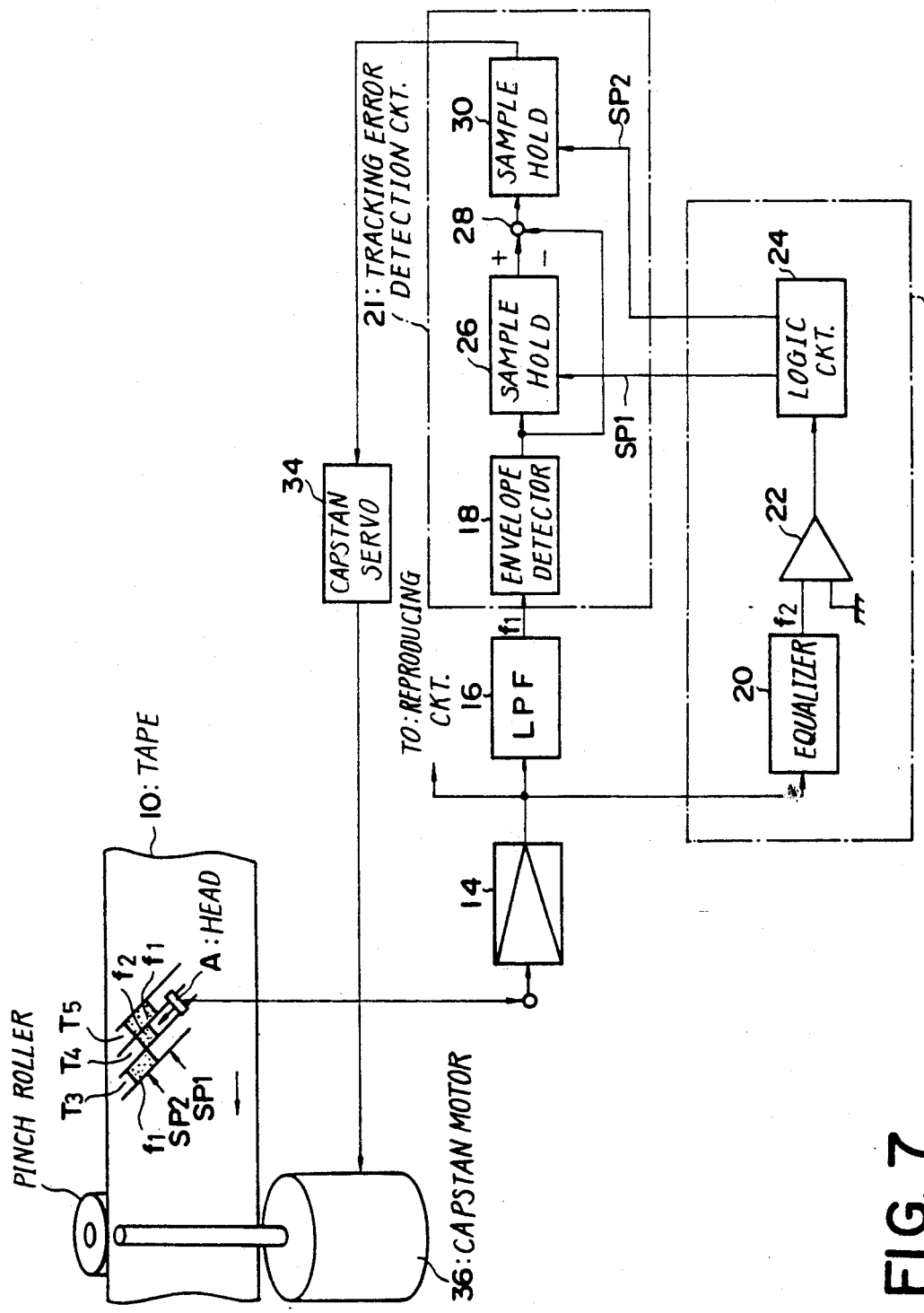
FIG. 7 is a block diagram showing an example of the prior art ATF device in an R-DAT.

A block synchronizing signal generation circuit 106 generates block synchronizing signals (referring to FIG. 5) which are placed at the beginning of a block respectively, a block being a basic unit of a track format. An ATF signal generation circuit 104 generates pilot signal f1, synchronizing signals f2 and f3, etc. which form respective patterns of ATF1 and ATF2. These signals are combined by a synthesizing circuit 108 in a suitable manner for the track format in FIG. 4. In this manner, a series of data which are to be recorded on a track are prepared.

These prepared series of data are applied to a switch 114 via a gain switch circuit 110 and a recording amplifier 112. The gain switch circuit 110 lowers the gain in accordance with a pilot flag from a circuit 116, which is raised during the period while the pilot signal f1 or ATF signal is being produced. Since the frequency of the pilot signal is low, if it is recorded with the same gain as other signals (or with the same recording current), this period alone is recorded excessively not to be easily erased when "over-write" occurs. The gain is therefore reduced to prevent such inconvenience during the period of the pilot signals to lower the recording current. The recording amplifier 112 amplifies the data to the level necessary to record it on the tape with the head 2. The switch 114 is connected to the "R" side at the recording, and feeds the output from the amplifier 112 to the heads A and B of the rotary head 2 to record the series of data on the tape.

Figure 3:
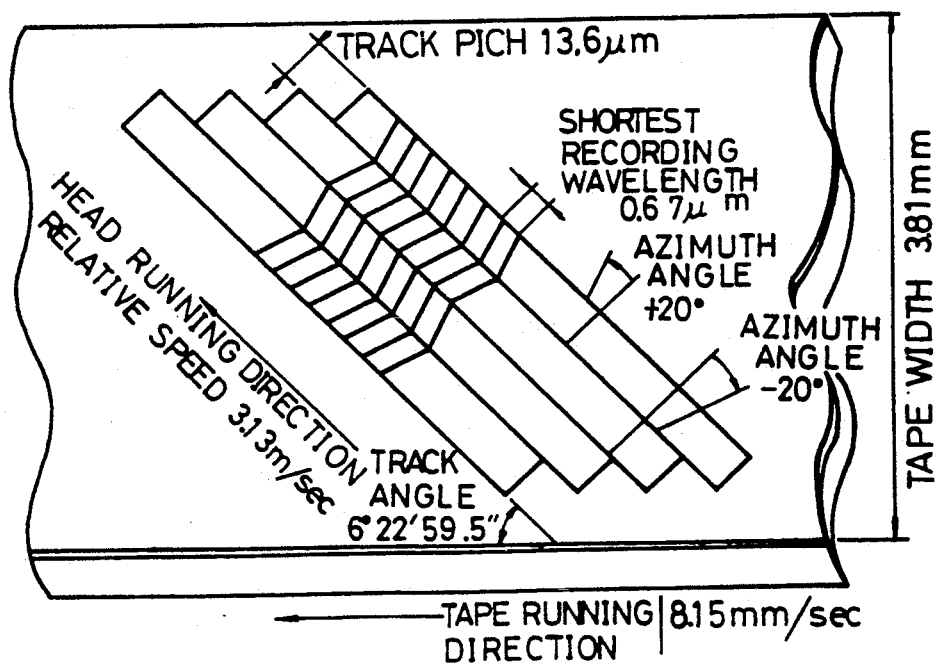
FIG. 3 is a tape format used for the R-DAT.

A drum servo circuit 118 compares the rotation detection signals produced by FG 30 and PG 32 with the reference clock produced by the reference clock/timing generation circuit 64 in frequency and phase in the recording mode to control the rotation of the drum motor 28 through PLL control. The drum servo circuit 118 controls the rotation phase of the rotary head 2 for setting the detection timing of the data fed to the heads A and B and that of the reference position detected by PG 32 at a predetermined timing so that the data for one track supplied from the amplifier 112 may be correctly recorded on one track on a tape as shown in FIG. 3.

The capstan servo circuit 120 controls the capstan motor 34 in PLL control to set the tape speed at a predetermined rate (8.15 mm/s) by comparing the output from FG 40 with the reference clock in frequency and phase.

A reel servo 122 drives a reel motor 42 to optimally suspend the tape without sagging.

Description will now be given to the sections which are operated for reproduction.

All the switches 78, 80, 92 and 114 are connected to the "P" side in the reproduction mode. The signals recorded on the tape are read by the heads A and B and applied to a preamplifier 124 via the switch 114. The output from the pre-amplifier 124 is fed to a PCM path 126 for reproducing PCM data and a controller path 128 for tracking control respectively.

The data fed in the PCM path 126 is compensated with respect to the frequency and phase characteristics of the heads A and B at a PCM equalizer 130 to open an eye pattern. The output from the PCM equalizer 130 is shaped in waveform into the digital signals of "1" and "0" by an inversion detecting circuit 132. Clock signal is also reproduced in a clock reproducing circuit 134.

The digital data which has been waveform-shaped is applied to a block synchronizing signal demodulation circuit 136 to be demodulated for identifying the beginning position of the data. It is also demodulated into the original data of the upper order 8 bits and the lower order 8 bits by a 10-8 demodulation circuit 140.

An error correction/de-interleave circuit 142 rearranges the reproduced data into the original pattern and corrects errors via a memory 98.

The corrected data now has 16 bits as the lower and upper 8 bits are combined. They are converted again to analog signals by a digital-to-analog converter 144. The analog signals are separated into the right and left channels and removed of unnecessary components by de-glitchers 146, 148. It is demodulated into the original audio signals by low-pass filters 82 and 84 via the switches 78 and 80, de-emphasized by de-emphasize circuits 150 and 152, and guided to output terminals 154 and 156 respectively.

The sub-codes reproduced at a sub code reproduction circuit 158 are fed to the system controller 54 to be used for displaying the musical number or time on the display 60 or for searching.

By the operation of the drum servo circuit 118, the rotary head 2 is rotated at a predetermined rate in response to the reference clock in a manner similar to the recording mode.

The reproduced signals supplied to the control path 128 are applied to an ATF synchronizing signal detection circuit 160 to detect synchronizing signals f2 and f3 in the ATF signals. A low-pass filter 164 extracts the crosstalk components of the pilot signal f1 from the adjacent tracks within the ATF signal. A pilot level detection circuit 166 detects the level of the crosstalk components, and a tracking error detection circuit 168 calculates the difference between the levels of the crosstalk components with the timing signal generated from a timing generation circuit 170 based on the synchronizing signals f2 and f3 to detect tracking errors. The tracking error signals are fed to the capstan servo circuit 120 via a VCA 174. The capstan servo circuit 120 controls the revolution rate of the capstan motor 34 so as to reduce the tracking errors to zero.

Figure 8:
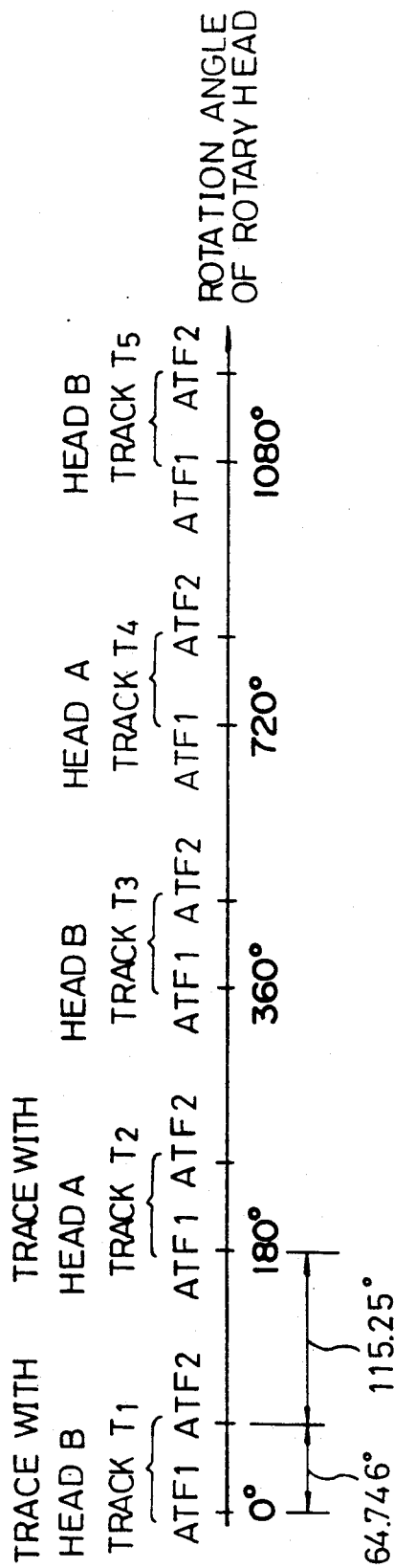
FIG. 8 is view showing timings at which ATF signals are obtained in the track format of FIG. 4.
Figure 9:
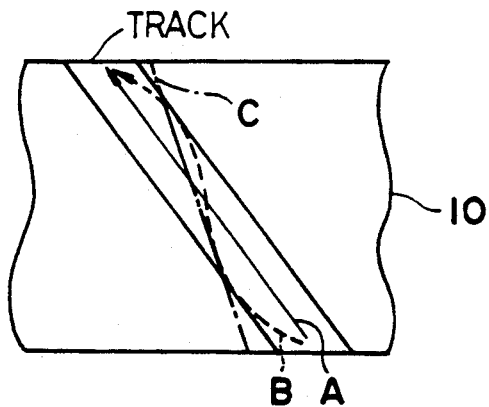
FIG. 9 is a view showing the tracing by a head on a track.
Figure 13:
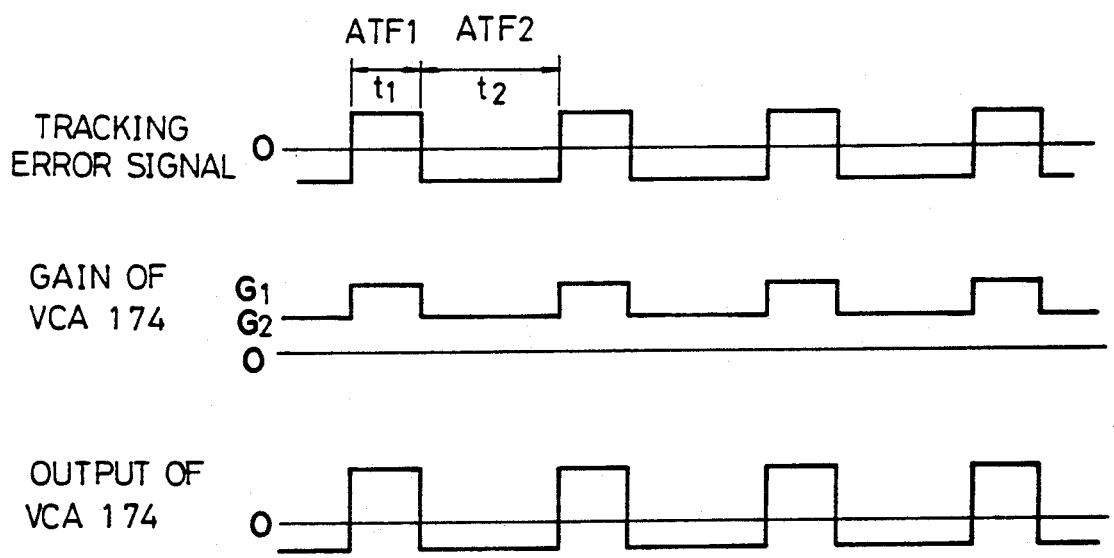
FIG. 13 is a view showing tracking operations in the embodiment of FIGS. 1A and 1B.

The ATF1/ATF2 discrimination circuit 176 judges whether the detected ATF signal is ATF1 or ATF2 in order to switch gains. As shown in FIG. 13, more specifically, if ATF1 is detected, the circuit switches the gain to a higher gain G1 whereas if ATF2 is detected, it switches the gain to a lower gain G2. The ratio of the gain G1 against G2 is expressed as $$G1 : G2 = t2 : t1$$

wherein t1 is the time duration the error signals obtained at ATF1 is effective whereas t2 is the duration of time the error signals obtained at ATF2 is effective. In other words, the ratio of the gain is in inverse proportion to the ratio of time interval. For the specific example of FIG. 13, corresponding to the timing relationship discussed in relationship to FIG. 8, it may be seen that the ratio of t2:t1 is approximately 2:1. (Specifically 115.254:64.746=1.780:1, as shown in FIG. 8). Accordingly, the ratio G1:G2 is thus also approximately 2:1.

Figure 10:
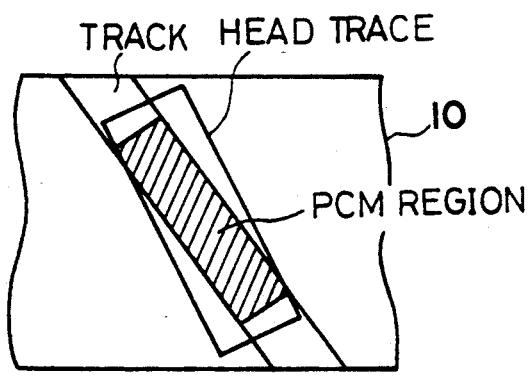
FIG. 10 is a view showing an optimal tracing state when the head is placed at an angle against the track.
Figure 11:
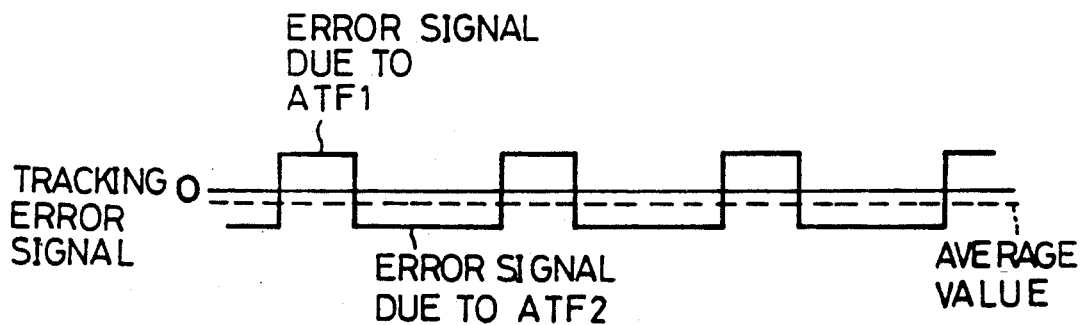
FIG. 11 is a view showing tracking error signals when the head traces a track in the state of FIG. 10 in the prior art ATF device of FIG. 7.
Figure 12:
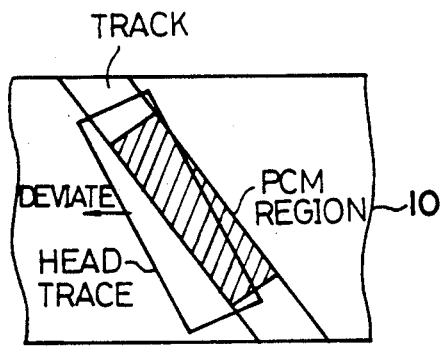
FIG. 12 is a view showing the tracing by the head with the tracking error signals shown in FIG. 11.

This equalizes the effects of tracking error signals obtained in ATF1 and ATF2 in the tracking servo. Accordingly, even if the head traces a track in a zigzag manner like a letter S or with an angle as shown in FIG. 10, the tracking error signal from VCA 174 becomes as shown in FIG. 13 to make the average level zero. It can retain the state of FIG. 10 without deviation as shown in FIG. 12. The head therefore can read PCM data with minimal missing data.

An ATF1/ATF2 discrimination circuit 176 may discriminate ATF1 from ATF2 by positional relation in respect of PCM. More particularly, as ATF1 is located before the PCM region in one track while ATF2 is located after the region, it can identify them positionally. Alternatively, if the output pulse from PG 32 can be obtained at the timing to start the track, the first ATF signal after the output pulse from PG 32 may be judged as ATF1 and the second may be judged as ATF2.

The pilot frequency detection circuit 172 is a circuit for searching which detects a pilot signal f1 among the ATF signals. When searching, it is necessary to occasionally read music number or time data out of the recorded content on the tape in order to "fast forward"

or "rewind" the tape at a target position. For the purpose, the relative speed between the heads A and B and the tape should be restricted at a value substantially same as that of recording. Pilot signal f1 is used for controlling the speed. In other words, as the pilot signal f1 is recorded in 130.67 kHz, it controls the reel servo circuit 122 to set the pilot signal f1 detected in the search at the frequency. This enables reading of music number and time data in sub-codes and feeding of the tape to the target position correctly.

Another embodiment of the invention will be described with reference to FIG. 14. In this embodiment, the time interval between corresponding tracking error signals is constant so that the time during which the tracking error signal is held is constant.

A reproduced signal from a head A and a head B are applied to a low-pass filter 246 through a reproducing amplifier 244 and a pilot signal f1 is extracted. The envelope of this pilot signal is detected by an envelope detection circuit 248 and applied to an ATF1 tracking error detection circuit 251 and an ATF2 tracking error detection circuit 255.

A synchronizing detector 249 detects synchronizing signals f2 and f3 by an equalizer 250 and a comparator 252 and produces a signal "1" in a section in which these signals are detected. An ATF1/ATF2 discrimination circuit 253 discriminates whether the detected ATF signal is ATF1 or ATF2 in the same fashion as in the previously described embodiment.

A logic circuit 254 produces, at the timing of the detected synchronizing signals f2 and f3, sample hold signals SP1 and SP2 when ATF1 has been detected and sample hold signals SP1' and SP2' when ATF2 has been detected. The sample hold signals SP1 and SP1' are generated at a timing immediately after starting of detection of the synchronizing signals f2 and f3 whereas the sample hold signals SP2 and SP2' are generated 2 blocks after the start of detection of the synchronizing signals f2 and f3 (timing substantially at the center of the pilot signal f1 of track T3 ).

Upon detection of the ATF1 signal and generation of the sample hold signal SP1, crosstalk amplitude level of the pilot signal f1 generated by the envelope detector 248 (referring to the head A of FIG. 14, pilot signal f1 in track T5 next to track T4 which is currently traced) is held in the sample hold circuit 256 of the ATF1 tracking error detection circuit 251. A subtractor 258 implements subtraction between the output of the sample hold circuit 256 and the output of the envelope detector 248. Upon generation of the sample hold signal SP2, the output of the subtractor 258 is held in a sample hold circuit 260. Referring, for example, to the head A of FIG. 1, this held value represents difference in crosstalk amplitude level between the pilot signals f1 from the tracks T3 and T5 which are adjacent on the left and right sides of the track which is currently being traced, i.e., a tracking error in the ATF1 signal. This held value is renewed each time a tracking error in the ATF1 signal is detected by the heads A and B.

Upon detection of the ATF2 signal and generation of the sample hold signal SP1', crosstalk amplitude level of the pilot signals in track T5 (in the case of the head A) generated by the envelope detector 248 is held in a sample hold circuit 262 of the ATF2 tracking error detection circuit 255. A subtractor 264 implements subtraction between the output of the sample hold circuit 262 and the output of the envelope detector 248. Upon generation of the sample hold signal SP2', the output of the subtractor 264 is held by a sample hold circuit 266. This held value represents difference in crosstalk amplitude level between the pilot signals f1 from the tracks T3 and T5 (in the case of the head A) which are adjacent on the left and right sides of the track which is currently being traced, i.e., a tracking error in the ATF2 signal. This held value is renewed each time a tracking error in the ATF2 signal is detected by the heads A and B.

The tracking error signals of the ATF1 signal and the ATF2 signal produced by the tracking error detection circuits 251 and 255 are added together by an adder 268 with weighting of 1 : 1 and the sum signal is applied to a capstan servo circuit 270.

Figure 14:
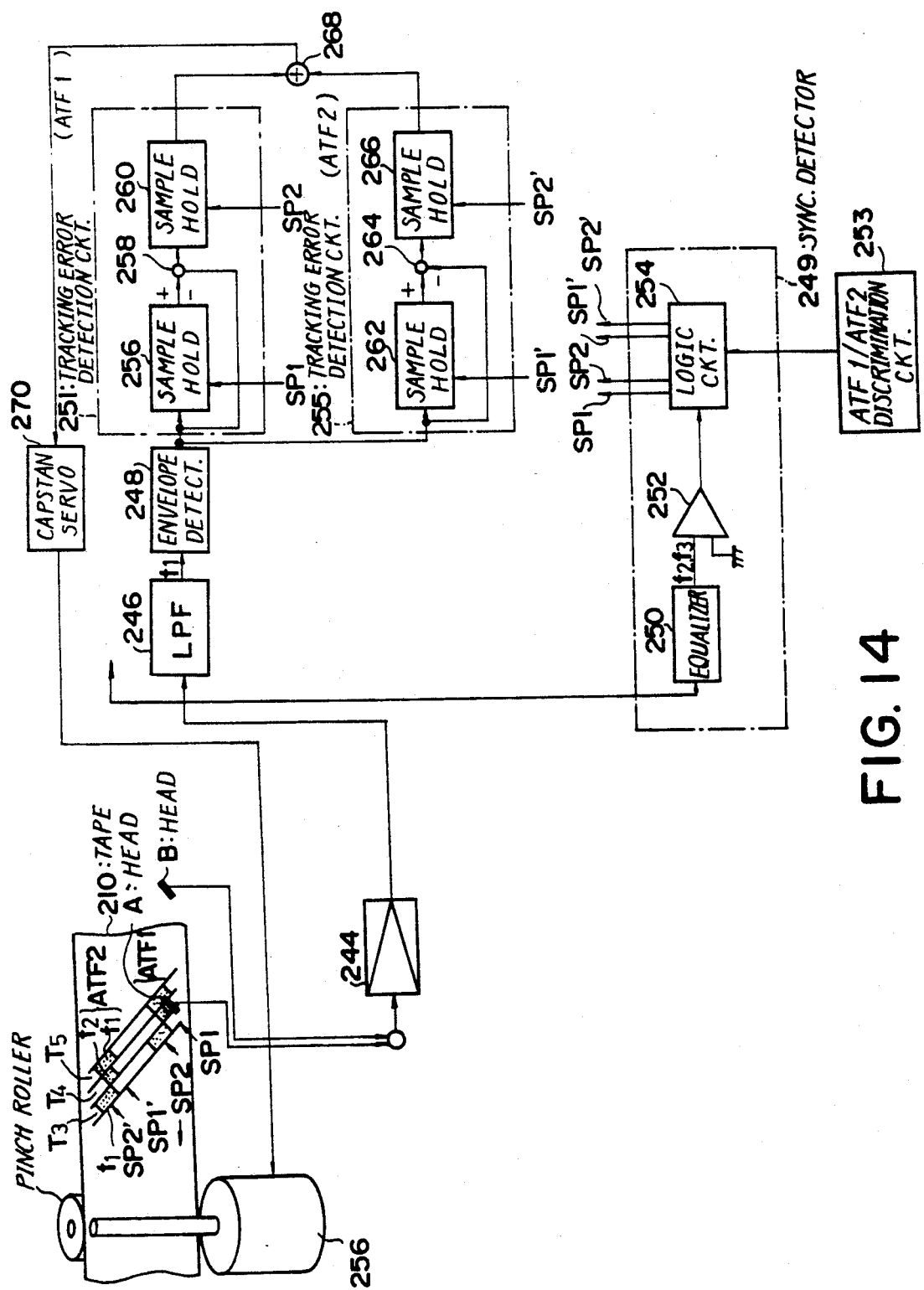
FIG. 14 is a block diagram showing another embodiment of the invention.

According to the circuit of FIG. 14, if a leftward tracking error takes place in the head A, the amount of crosstalk of the pilot signal from track T3 increases so that negative signals are held in the sample hold circuits 260 and 266, added together by the adder 268 and supplied to the capstan servo circuit 254 thereby to increase the speed of a capstan motor 256 to correct the tracking error.

If a rightward tracking error takes place in the head A, the amount of crosstalk of the pilot signal from track T5 increases so that positive signals are held in the sample hold circuits 260 and 266, added together by the adder 268 and supplied to the capstan servo circuit 254 thereby to decrease the speed of the capstan motor 256 to correct the tracking error.

Figure 15:
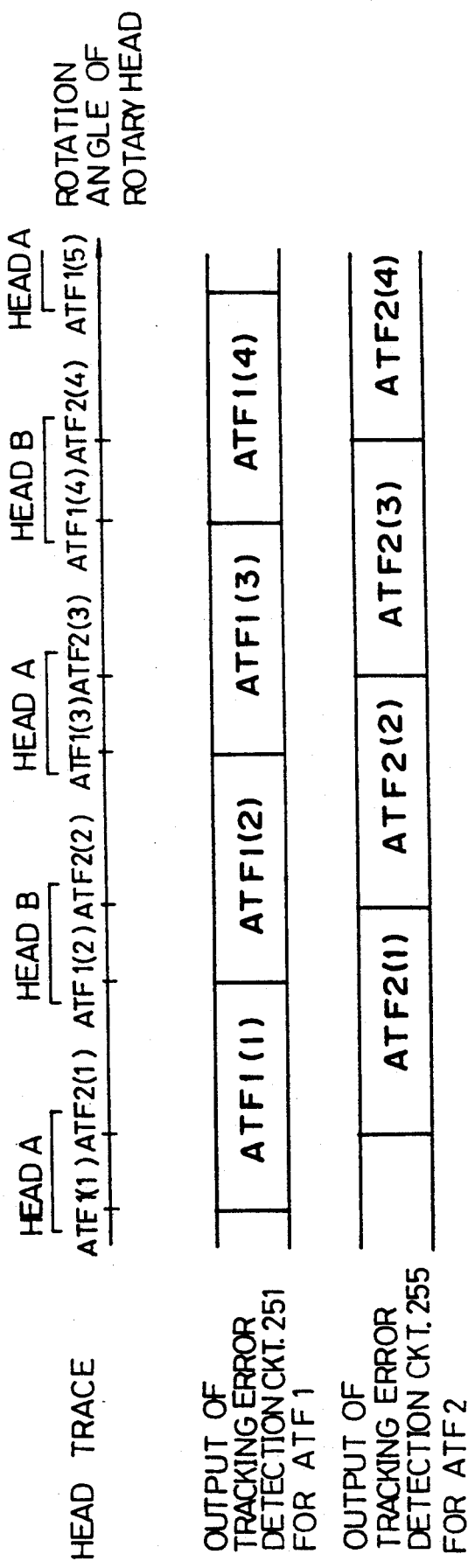
FIG. 15 is a view showing tracing operations in the embodiment of FIG. 14.

Output error signals of the ATF1 and ATF2 tracking error detection circuits 251 and 255 in the circuit of FIG. 14 are shown in FIG. 15. Although time interval between time points at which the tracking error is detected by the ATF1 and ATF2 signals is not constant, time interval between one ATF1 signal and a next ATF1 signal and time interval between one ATF2 signal and a next ATF2 signal are constant. Accordingly, by renewing the tracking error due to ATF1 by ATF1 and renewing the tracking error due to ATF2 by ATF2, time interval during which the tracking error is held becomes always constant with a result that influence of the ATF1 signal and influence of the ATF2 signal on the tracking servo become equal whereby tracking can be performed under an optimum condition.

Although the foregoing statement is related to an application of the present invention to the R DAT, it is applicable also to VTR and other various magnetic recording and reproducing devices which can record and reproduce signals with a rotary head with plural heads, and which can automatically control tracking by detecting, based on a timing of a synchronizing signal on a track, crosstalk components of pilot signals from adjacent tracks and comparing them to produce error signals.

What is claimed is:

1. A magnetic recording and reproducing device comprising:
a rotary head incorporating a plurality of heads for recording and reproducing an input signal by tracing a magnetic recording medium, said heads also reproducing signals recorded on left and right adjacent tracks simultaneously, and data recorded on said magnetic recording medium including the input signal, a synchronizing signal used for timing control of recording and reproducing of said input signal and a pilot signal of a predetermined frequency used for tracking control; and
tracking control means comprising:

tracking error signal generation means for generating, at time points spaced at uneven time intervals based on the timing of said synchronizing signal, a tracking error signal by detecting crosstalk component of the pilot signals on left and right adjacent tracks and comparing these components with each other; and relative speed control means for controlling responsive to the tracking error signal, a relative speed of said magnetic recording medium with respect to said heads of said rotary head by controlling transfer gain of the tracking error signal in said relative speed control means to provide varying gain in accordance with the time interval between the time points at which the tracking error signal is generated.

2. A magnetic recording and reproducing device as defined in claim 1 wherein the transfer gain of the tracking error signal is controlled to change substantially in inverse proportion to the time interval between time points at which the tracking error signal is generated.

3. A magnetic recording and reproducing device as defined in claim 2 wherein said relative speed control means comprises voltage controlled amplifier (VCA) means through which the tracking error signal passes, the VCA means controlling the transfer gain of the tracking error signal.

4. A magnetic recording and reproducing device as defined in claim 3 wherein said relative speed control means controls, responsive to output of said VCA means, servo control means for a capstan motor which drives said magnetic recording medium through a capstan.

5. A magnetic recording and reproducing device comprising:

a rotary head incorporating a plurality of heads for recording and reproducing an input signal by tracing a magnetic recording medium, said heads also reproducing signals recorded on left and right adjacent tracks simultaneously, and data recorded on said magnetic recording medium including the input signal, a synchronizing signal used for timing control of recording and reproducing of said input signal and a pilot signal of a predetermined frequency used for tracking control, a series of which pilot signals are reproduced alternately by different ones of said plurality of heads; and tracking control means comprising:

tracking error signal generation means for receiving pilot signals from said plurality of head and generating, at uneven time intervals based on the timing of said synchronizing signal, tracking error signals by detecting crosstalk components of the pilot signals on left and right adjacent tracks and comparing these components with each other;

holding and renewing means for separately holding the tracking error signals generated alternately in response to the alternately generated pilot signal until next timing of generation of a corresponding tracking error signal and renewing the tracking error signal thus held at said next timing of generation of the corresponding tracking error signal wherein said alternate tracking error signals are renewed separately; and relative speed control means for combining the tracking error signals held by said holding and renewing means and for controlling a relative speed of said magnetic recording medium with respect to said heads of said rotary head based on said combined tracking error signals.

6. A magnetic recording and reproducing device as defined in claim 5, wherein said tracking control means further comprises discrimination means for discriminating said alternate pilot signals.

7. A magnetic recording and reproducing device as defined in claim 6, wherein said holding and renewing means comprises first and second sample and hold circuit for separately sampling and holding, respectively, said alternate tracking error signals.

8. A magnetic recording and reproducing device as defined in claim 7, wherein said tracking control means further comprises summing means for summing said separately held alternate tracking error signals.

* * * * *